(No Model.)
R. McMAKIN.
BABY CARRIAGE.
No. 410,804.　　　　　　　　Patented Sept. 10, 1889.
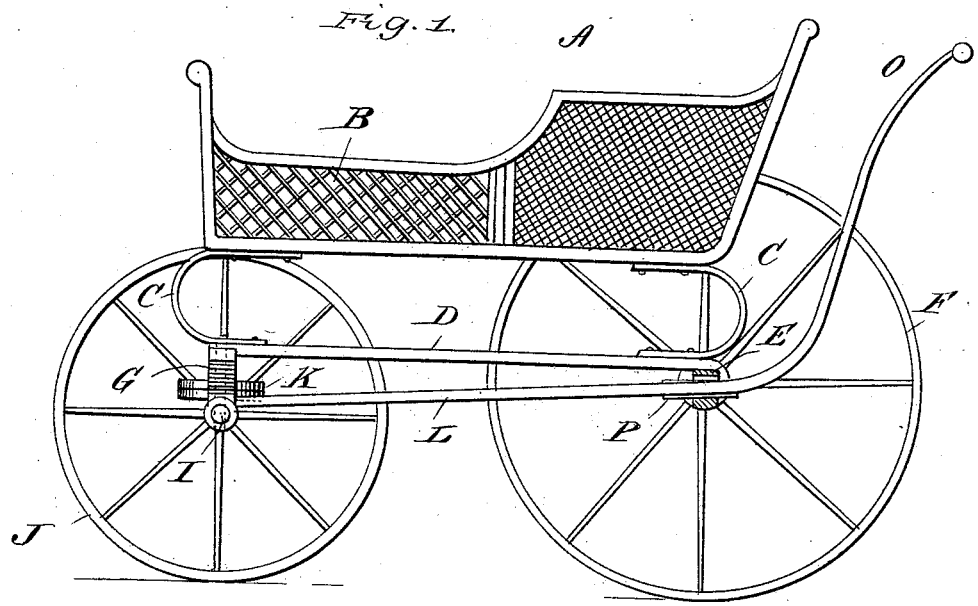
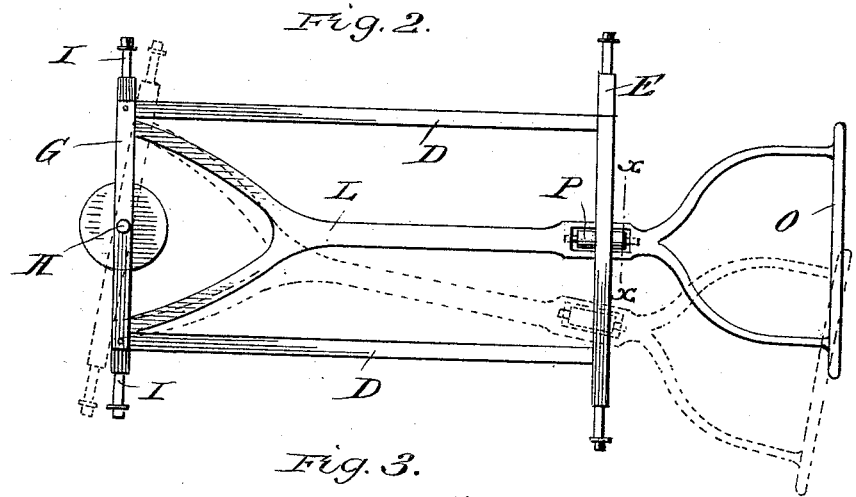
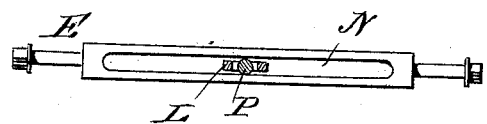
WITNESSES:
N. R. Davis
C. Sedgwick
INVENTOR
R. McMakin
BY Munn & Co.
ATTORNEY

United States Patent Office.

RODOLPH McMAKIN, OF NEW ALBANY, INDIANA, ASSIGNOR TO HIMSELF AND ELI T. OGLE, OF SAME PLACE.

BABY-CARRIAGE.

SPECIFICATION forming part of Letters Patent No. 410,804, dated September 10, 1889.

Application filed March 12, 1889. Serial No. 302,965. (No model.)

*To all whom it may concern:*

Be it known that I, RODOLPH McMAKIN, of New Albany, in the county of Floyd and State of Indiana, have invented a new and Improved Baby-Carriage, of which the following is a full, clear, and exact description.

The object of the invention is to provide a new and improved baby-carriage which is simple and durable in construction and can easily be pushed in any direction without lifting or using the handle as a lever to pry or twist the carriage to either side, as is the case with carriages now in use.

The invention consists of a front axle pivotally connected with the carriage-body and of a propelling and guiding bar extending rearward from the front axle and provided with a handle for pushing and directing the carriage.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a side elevation of the improvement with part of the rear axle in section. Fig. 2 is a plan view of the steering-gear, and Fig. 3 is a sectional end elevation of the same on the line *x x* of Fig. 1.

The improved baby-carriage A is provided with the usual carriage-body B, connected on its under side by springs C with the side bars D, rigidly connected at their rear ends with the rear axle E, carrying at its ends the usual rear wheels F. The front ends of the side bars D are rigidly connected with the bolster G, connected by a king-bolt H with the front axle I, carrying at its ends the front wheels J. The fifth-wheel K is interposed between the bolster G and the axle I on the king-bolt H. From the front axle I extends rearward a propelling and guiding bar L, passing through a transverse slot N, formed in the rear axle E, and then extending upward at the rear of the carriage-body B to form the usual handle O for pushing and directing the carriage. On the propelling and directing bar L is mounted to turn a roller P, traveling in the slot N of the rear axle E, so as to ease the sidewise movement of the propelling and guiding bar whenever it is desired to push the same to one side.

The operation is as follows: When the propelling and guiding bar L extends through the middle of the rear axle E, as shown in full lines in Fig. 2, and the operator pushes on the handle O, then the carriage is propelled straight forward. When the operator desires to turn the carriage—around a corner, for instance—the handle O is moved to one side, so that the front axle I turns on the king-bolt H, whereby the front wheels J assume an angular position in relation to the rear wheels F. A forward push on the handle O now causes the carriage to travel in a curve around the corner. As soon as it is desired to again move the carriage straight the operator again moves the handle O so that the bar L again assumes its normal position in the middle of the axle E. It is understood that when the operator desires to turn to the right he moves the handle O to the left, and when he desires te turn the carriage to the left he moves the handle O to the right. Thus it will be seen that by a very convenient and simple device the carriage can be pushed in any direction without lifting or using the handle as a lever to pry or twist the carriage to either side in order to turn it, as is the case with the carriages now in use.

Having thus fully described my invention, I claim as new and desire to secure by Letters Patent—

1. The combination, with a baby-carriage having its front axle centrally pivoted to turn horizontally, of a guiding and propelling bar extending from a point behind the carriage in reach of the user downwardly and forwardly under the carriage to a point near the front thereof and there forked, the ends of which fork are secured to the front axle, the fork being rigidly and immovably connected with or formed upon the said bar to move as an integral part thereof, substantially as set forth.

2. In a baby-carriage, the combination, with the carriage-body, of a rear axle rigidly connected with the said carriage-body and provided with a horizontal longitudinally-extending slot, rear wheels mounted to turn on the said rear axle, a bolster held on the front end of the said carriage-body, a front axle carrying the front wheels and pivotally connected with the said bolster, a propelling and guiding bar extending rearward from the said front axle and provided with a handle for pushing and directing the carriage, said propelling and guiding bar passing through said slot in the rear axle and having a free horizontal oscillating movement therein, substantially as shown and described.

3. In a baby-carriage, the combination, with the carriage-body, of a rear axle rigidly connected with the said carriage-body, rear wheels mounted to turn on the said rear axle, a bolster held on the front end of the said carriage-body, a front axle carrying the front wheels and pivotally connected with the said bolster, a propelling and guiding bar extending rearward from the said front axle and provided with a handle for pushing and directing the carriage, said horizontally-oscillating propelling and guiding bar passing through a slot extending transversely in the said rear axle, and a friction-wheel held on the said propelling and guiding bar in the said slot, substantially as shown and described.

4. In a baby-carriage, the combination, with the carriage-body, of side bars connected by springs with the said carriage-body, a rear axle rigidly connected with the said side bars and carrying the rear wheels, a bolster rigidly connected with the front ends of the said side bars, a front axle pivotally connected by a king-bolt with the said bolster, a fifth-wheel located between the said bolster and said front axle on the king-bolt, front wheels held on the said front axle, and a rearwardly-extending propelling and guiding bar guided in the rear axle and provided with an upwardly-extending handle for pushing and directing the carriage, substantially as shown and described.

RODOLPH McMAKIN.

Witnesses:
ALVIN B. SHAW,
JAMES G. HARRISON.